United States Patent [19]
Aonuma et al.
[11] 3,902,888
[45] Sept. 2, 1975

[54] PROCESS FOR PREPARING FERROMAGNETIC ALLOY POWDER

[75] Inventors: Masashi Aonuma; Tatsuji Kitamoto; Goro Akashi, all of Kanagawa, Japan

[73] Assignee: Fuji Photo Film Co., Ltd., Minami-Ashigara, Japan

[22] Filed: July 29, 1974

[21] Appl. No.: 492,819

Related U.S. Application Data

[63] Continuation of Ser. No. 281,671, Aug. 18, 1972, abandoned.

[30] Foreign Application Priority Data

Aug. 19, 1971 Japan .............................. 46-63230

[52] U.S. Cl. .................. 75/.5 AA; 75/108; 75/119; 148/105

[51] Int. Cl.[2] ........................................ B22F 9/00

[58] Field of Search ........ 75/.5 AA, .5 A, .5 R, 108, 75/119; 148/105

[56] References Cited

UNITED STATES PATENTS

| | | | |
|---|---|---|---|
| 3,494,760 | 2/1970 | Ginder | 75/.5 AA |
| 3,535,104 | 10/1970 | Little et al. | 75/.5 AA |
| 3,560,200 | 2/1971 | Nesbitt et al. | 75/.5 R |
| 3,598,568 | 8/1971 | Klomp et al. | 75/.5 AA |
| 3,607,218 | 9/1971 | Akashi et al. | 75/.5 AA |
| 3,607,220 | 9/1971 | van der Glessen et al. | 75/.5 AA |
| 3,627,509 | 12/1971 | van der Glessen et al. | 75/.5 AA |
| 3,669,643 | 6/1972 | Bagley et al. | 75/.5 AA |
| 3,702,270 | 11/1972 | Kawasaki et al. | 75/.5 AA |

FOREIGN PATENTS OR APPLICATIONS

| | | | |
|---|---|---|---|
| 1,033,554 | 6/1966 | United Kingdom | 75/.5 R |
| 678,298 | 1/1964 | Canada | 75/.5 R |

*Primary Examiner*—G. Ozaki
*Attorney, Agent, or Firm*—Sughrue, Rothwell, Mion, Zinn & Macpeak

[57] ABSTRACT

A process for preparing a ferromagnetic alloy powder comprising reducing salts of ferromagnetic metals in an aqueous solution containing an acicular fine powder in the presence of hypophosphite ion is disclosed. The aqueous solution can be subjected to the action of a magnetic field or ultrasonic waves during the reaction if desired, and the rate of the reaction can be increased by the addition to the aqueous solution of a noble metal ion.

19 Claims, No Drawings

PROCESS FOR PREPARING FERROMAGNETIC ALLOY POWDER

This is a continuation of application Ser. No. 281,671, filed Aug. 18, 1972 now abandoned.

BACKGROUND OF THE INVENTION

1. Field of the Invention

This invention relates to a process for preparing magnetic materials useful for the production of magnetic recording materials such as audio tapes, video tapes, memory tapes and the like.

2. Description of the Prior Art

Generally speaking, magnetic recording materials have very wide usefulness covering those fields of application where records or signs are convertible into electric or magnetic signals. Although, in the following explanation, the present invention is explained merely by referring to those magnetic recording materials such as audio tapes, video tapes and memory tapes, it is to be understood that the present invention is applicable to other magnetic recording materials where the recording principles involved are based on the same principles as above, and such magnetic recording materials are also included in the scope of the present invention.

As to the magnetic materials used for the production of magnetic recording materials, those materials such as ferromagnetic iron oxide powders, chromium dioxide powders, cobalt ferrite powders, ferromagnetic alloy powders and ferromagnetic metal foils are known. But at present, magnetic materials of the ferromagnetic iron oxide powder series materials are predominantly used. But this is only due to the fact that the magnetic materials of the ferromagnetic iron oxide powder series are easy to produce, easy to use and less expensive, and their magnetic properties are theoretically superior to other materials.

It has been known that magnetic materials of an alloy powder and a metal foil has a higher magnetic flux density per volume than ferromagnetic iron oxide series magnetic materials, and also has the characteristic property that it is easy to control their coercive force. With the advances in the techniques of magnetic recording materials, they are used in such fields as extremely short wave range high density recording, as shown by the ability to reduce the speed of video tapes, and in the high density recording of memory tapes. However, known magnetic materials of the ferromagnetic iron oxide powder series materials are not adequate for high density recording due to insufficient magnetic recording properties such as maximum residual magnetic flux density and coercive force. Accordingly, at present, utilization of such magnetic materials as chromium dioxide powders, cobalt ferrite powders, ferromagnetic alloy powders and ferromagnetic metal foils, is noted and stressed.

So far for the preparation of ferromagnetic powders, several processes are known, such as:

1. a process of preparing an alloy powder by reducing the oxalate of ferromagnetic metals in a hydrogen gas stream at an elevated temperature, 2. a process of preparing an alloy powder by reducing goethite or acicular $\gamma$-$Fe_2O_3$ in hydrogen gas stream at an elevated temperature, 3. a process of preparing a metal powder by evaporating a ferromagnetic metal in an inert gas, 4. a process of preparing an alloy powder by reducing a solution of a ferromagnetic metal salt with borohydride in a wet process, 5. a process of preparing a metal powder by decomposing a ferromagnetic metal carbonyl compound, and 6. a process of preparing a metal powder by depositing electrolytically a ferromagnetic metal on a mercury cathode, and heating the so deposited metal to separate the mercury from the desired metal powder.

However, an alloy powder so obtained using any of these known processes, has various defects resulting from the process employed. For example, similar to process 1 and process 2 above, the process of preparing an alloy powder by producing the oxalate, goethite powder or $\gamma$-$Fe_2O_3$ powder in a wet process in the first step, and then reducing the powder to give the alloy powder in a dry process in the second step, has the defect inherent in the process, such as the volume of the powder obtained would be decreased during the high temperature reducing step and particles having cavities in the individual particles are obtained. Other essential defects accompanying the process are (1) sintering of the particles, (2) activation of the surface of the particles, and (3) deformation of the particles, etc.

Therefore, when an alloy powder so prepared is used, insufficient dispersion of the alloy powder occurs, and it is difficult to obtain the advantageous effects of a ferromagnetic alloy powder. By processes 1, 2 and 3, the particles produced have higher surface activity and it is difficult to handle them after the reduction or evaporation steps, for if they are handled with carelessness, there is the possibility of fire. That means these processes contain various problems and unstable factors for use as an industrial process in regard to the production of, the properties of and the handling of the alloy powder.

As to processes 4, 5 and 6, it can be said that these are the processes eliminating the defects accompanying the wet process in principle. However, the individual particles of the alloy powder obtainable by process 4 have a fibrous form or shape, and due to the step of mixing and dispersing the powder in the binding agent for the production of desired magnetic recording materials, the form or shape of the powder would be destroyed and the magnetic field orientational property of the powder would be adversely effected. That fact would be observed from a poor squareness ratio (Br/Bs).

Several reasons attributable to this phenomenon may be considered, and one of which is the small binding force or strength of the primary particle due to the strong reducing power of the borohydride used. Therefore, it is believed that the thus produced particles are easily destroyed during the dispersing step of the particles into the binding agent in a ball-mill. This is easily estimated by an observation of the particles after milling under an electron microscope or using other means.

In processes 5 and 6, since poisonous materials such as metal carbonyl compounds or mercury are used, the processes must be handled very carefully. Therefore, these processes also contain disadvantageous characteristics as industrial processes, in regard to the production of the alloy powder and the handling of the process itself.

In order to avoid these defects of the known processes, a process for producing a ferromagnetic alloy powder by reducing the salts of ferromagnetic metals with hypophosphite ion, was developed.

The alloy powder obtainable by this reduction with hypophosphite ion is generally one grown using palladium chloride as the crystallization nucleus, and since the individual particles of the alloy powder obtained without applying magnetic field are spherical in form, they have a poor orientational property. On the other hand, the alloy powder obtainable in a magnetic field is in the form of individual columns, by a connection of the spherical particles to each other in a linear manner. The thus obtained alloy powder has an excellent squareness ratio (Br/Bs) of 0.9 when they are dispersed in the binding agent in a relatively short period of time and coated on the surface of tape, whereas they have a very poor squareness ratio of about 0.7 when they are well dispersed in the binding agent.

The present invention provides a process for producing a ferromagnetic alloy powder, eliminating the defects of the known process, in which salts of ferromagnetic metals are reduced with hypophosphite ion.

An object of the present invention is directed to an improvement in the hypophosphite process which is an alternative process to the known borohydride process, using the wet process to give a ferromagnetic alloy powder eliminating these defects of the dry process, having an excellent coercive force and squareness ratio, in a very simplified process.

SUMMARY OF THE INVENTION

The present invention is an improvement in the process for the production of a ferromagnetic alloy powder using hypophosphite as a reducing agent which has less reducing power than borohydride as disclosed in the specification of German Offenlegungsschrift No. 2,132,430 using a reaction bath containing metal salts, a pH buffering agent, a complexing agent, a stabilizing agent and an accelerating agent, adjusting the pH, temperature and other reaction conditions by additives, subjecting the reaction bath to the action of a magnetic field or ultra-sonic waves, if necessary, to give a ferromagnetic alloy powder directly, whereby an acicular fine powder as a precipitation nucleus is incorporated into the reaction bath at the beginning of the reaction or previous to the reaction.

DETAILED DESCRIPTION OF THE INVENTION

Reaction baths which are useful for the process of the present invention include: a sulfate solution bath, a chloride solution bath, an acetate solution bath, a formate solution bath, a sulfamate solution bath, a nitrate solution bath, a hypophosphite solution bath, a pyrophosphite solution bath and a triethanol amine solution bath, and the reaction bath contains Co, Co-Ni alloy system as a main constituent. The reaction bath further contains as a minor constituent, preferably rare earth elements such as La, Ce, Nd, Sm and the like, and other elements such as Al, S, Cr, Mn, Fe, Cu, Zn and the like in their ion forms. As the reducing agent, hypophosphoric acid, or hypophosphites of an alkali metal such as sodium and potassium, of an alkaline earth metal such as magnesium, calcium and barium, and of a divalent metal such as cobalt and nickel, can be employed. As the pH buffering agent, a mono-carboxylic acid, its salt, or an inorganic acid such as boric acid, carbonic acid, and sulfurous acid, are effectively used. As the complexing agent, a mono-carboxylic acid such as formic acid, acetic acid and benzoic acid, a di-carboxylic acid such as oxalic acid, succinic acid and malonic acid, an oxy-carboxylic acid such as glycolic acid, tartaric acid, and citric acid and the salts thereof such as the alkali metal salt are effectively used. As the pH adjusting agent, ordinary inorganic acids, organic acids, ammonia, alkali metal hydroxides and alkali metal carbonates are effectively used.

These additives have not only the respective function as indicated above, but also have an interacting function, for example, some additives act both as a complexing agent and a pH bufferring agent, therefore, it must be understood that the function of the respective additives is not limited to one function only.

As to the acicular fine powder acting as precipitation nucleus incorporated into the reaction bath, a particle size of less than 0.3$\mu$ in length and less than 0.03$\mu$ in width is preferred, since the final size of the alloy powder desired is 0.1 to 1$\mu$ in length and a length/width ratio of 3:1. Examples of these fine powders include: those acicular fine powders of diatomaceous earth goethite ($\alpha$-FeOOH), lepidocrocite ($\gamma$-FeOOH), acicular fine powder of $\gamma$-$Fe_2O_3$, magnetite, $CrO_2$ fine powder, Attapulgus clay (Trade Name: ATTA-GEL), copper phthalocyanine, acicular ZnO, and acicular particles of $V_2O_5$.

The acicular particles used as the precipitation nucleus are preferably activated by a noble metal ion such as Pd, Au and Ag. In other words, the acicular particles used in the process of the present invention are not the same substance as the alloy itself, therefore, there are many cases where growth of alloy particles is secured when the surface of the acicular particles are activated.

The preferred reaction condition employed in the process of the present invention is a pH of higher than 5, but the reaction temperature is not critical. However, it is preferred to conduct the reaction at a pH ranging from 8 to 12 and at a temperature ranging from 70° to 95°C.

Any metal ion concentration in the reaction bath may be employed so long as the concentration is not in the super saturation range, but too high a metal concentration requires a large amount of complexing agent and it is difficult to adjust the reaction bath and too small a metal concentration results in less yield of the ferromagnetic alloy powder. Therefore, a preferred metal concentration ranges from 0.5 to 20 g/liter of the bath. However, it must be understood that the recitation of this concentration range is by no means intended to limit the scope of the invention and the concentration is easily changeable as to temperature, pH, kinds of metal salts used and other reaction conditions.

Further, it is preferred that the reaction be conducted by adding to the reaction bath a solution containing a noble metal ion such as Pd, Au, Ag and the like, and/or an organic solvent such as an alcohol at the time of starting the reaction, and also the reaction is conducted while applying a magnetic field of more than 200 oersteds, preferably from 500 to 3,000 oersteds or ultra-sonic waves of about 20 to 400 KHz, or a combination thereof, to the reaction system.

The ferromagnetic alloy powder obtained by the process of the invention has a coercive force (Hc) of greater than 500 oe, a saturation magnetization ($4\pi I_s$) of greater than 8,000 G/CC (Gauss/CC), and the main component of the powder is Co, Co-Ni, and contains about 10 percent by weight or less of P depending on the reaction conditions employed. Further, the size of the particles obtained may be adjusted and it is possible to obtain any desired particle size by selecting the kind and amount of acicular particles added, and other reaction conditions.

The following examples will serve to illustrate a preferred embodiment of the invention. All parts and percents are by weight unless otherwise indicated.

EXAMPLE 1

| | | | |
|---|---|---|---|
| Liquid A | Cobalt Sulfate | 10 | g |
| | Sodium Tartrate | 50 | g |
| | Boric Acid | 15 | g |
| | Water in an amount to give 300 cc of solution | | |
| Liquid B | 50 Hypophosphorous Acid | 25 | cc |
| Liquid C | Acicular Goethite of about 0.2$\mu$ in length and 0.05 $\mu$ in width | 0.2 | g |
| | Water in an amount to give 10 cc suspension | | |

Liquid A and Liquid B were prepared and mixed together. Into the mixture, an additional amount of water was added to give 500 cc of solution. The resulting solution was adjusted to a pH of 9.0 by adding a sodium hydroxide solution and was heated to 90°C. Into the solution, Liquid C activated previously with a 0.3 percent palladium chloride solution was added with stirring. The reaction was conducted while maintaining the temperature at 90°C and the pH in the range of 8.5 – 9.0 by adding a sodium hydroxide solution. The precipitate so formed was washed with water and dried to give an alloy powder. The yield of the alloy powder was 2.6 g. The average size of the rod shaped particles obtained was 0.8$\mu$ in length, and a length/width ratio of about 5:1. The coercive force of the particles was 800 oe, and the saturation magnetization ($4\pi IS$) was 14,000 G/CC.

For the purposes of comparison, this procedure was repeated but using Liquid C containing only palladium chloride as metal precipitation nucleus with no acicular particles and globular particles were obtained. The globular particles obtained had a remarkably low ratio of residual magnetic flux to saturated magnetic flux, i.e., a squareness ratio (Br/Bs) of about 0.5, and had a coercive force of 500 oe.

When the reaction was conducted using these acicular particles as a precipitation nucleus and applying a direct current magnetic field of 2,000 G during the reaction, rod-shaped particles of an average size of 1.2$\mu$ in length and a length/width ratio of 8:1 and having a coercive force of 1,000 oe were obtained. The thus obtained alloy powder was dispersed thoroughly in a binding agent and the dispersion was coated on the surface of a tape. The B - H property of the tape was excellent and, more especially, the squareness ratio (Br/Bs) was 0.90.

As described above, by using Liquid C, that is to say, using acicular particles as a precipitation nucleus, a rod shaped alloy powder was obtained, and it was possible to use the powder in such a way by utilizing its dimensional anisotropic property, just like the known and conventionally used acicular iron oxide powder.

EXAMPLE 2

-Continued

| | | | |
|---|---|---|---|
| Liquid A | Nickel Sulfamate | 3 | g |
| | Cobalt Sulfamate | 7 | g |
| | Sodium Citrate | 50 | g |
| | Boric Acid | 20 | g |
| | Water in amount to give 300 cc of solution | | |
| Liquid B | Sodium Hypophosphite | 20 | g |
| | Water in amount to give 50 cc of solution | | |
| Liquid C | Attapulgus Clay (ATTA - GEL - 40, available from Minerals & Chemicals, Division, U.S.A.) | 0.2 | |
| | Water in amount to give 100 cc of dispersion | | |

Liquid A and Liquid B were prepared and mixed together. Into the mixture, water was added to give 500 cc of solution. The resulting solution was heated to 80°C and while maintaining the solution at that temperature and at the same time adjusting the pH to 10.0 – 10.5, Liquid C previously activated by 0.03 percent of chloroauric acid was added to the solution to begin the reaction. During the reaction, 2,000 gausses of magnetic field by direct current was applied. The precipitate thus formed was washed with water and dried to give an alloy powder. The reaction was completed in a period of 5 minutes and the yield of the powder was 2.8 g. The average size of the rod-shaped particles thus obtained was 0.8$\mu$ in length, and a length/width ratio of 4:1. The coercive force of the particles was 1,000 oe., and the saturation magnetization was 10,000 G/CC.

For the purposes of comparison, this procedure was repeated but without applying a magnetic field during the reaction and alloy particles of an average size of 0.6$\mu$ and a coercive force of 950 oe, a saturation magnetization of 10,000 G/CC, were obtained.

The alloy powder thus obtained was dispersed throughly in a binding agent and the dispersion was coated on the surface of a tape. The tape had a squareness ratio of 0.85.

Further, for comparison purposes, Liquid C was used without activation, and it was found that although the reaction speed was very slow and a fairly long time was required to complete the reaction, the formed precipitates were rod-like in shape.

As is apparent from the above results, while the squareness ratio of the particles obtainable using Liquid C without acicular particles and without applying a magnetic field was only 0.5, but the squareness ratio of the particles obtained in accordance with this process was remarkably improved, i.e. 0.85 and 0.9, respectively. By the process of this invention, even without a magnetic field, rod-like particles were obtained and an excellent squareness ratio resulted.

Also it is apparent from the above examples that activation by the noble metal ion of the Liquid C, containing acicular particles, is quite effective to accelerate the reaction. The improvement in the magnetic properties of the particles is completely due to the fact that the obtained particles being a rod or rod-like shape, which results from the acicular particles used as precipitation nucleus.

In Examples 1 and 2 above, it was observed that when from 0 to several percent of other elements were incorporated into the reaction bath the coercive force of the resulting particles was improved due to the impurity effect. For example, by incorporating into the reaction bath a small amount of rare earth elements such as La, Ce, Nd, Sm and the like, or other elements such as Al, S, Cr, Mn, Fe, Cu, Zn and the like, improvements in the coercive force of the particles were observed.

Also in Examples 1 and 2 above, it was found that when the constituents of Liquid B and Liquid C were exchanged for each other, the same results could be obtained.

As described above, it is possible to add and an effective way to add other elements, such as rare earth elements, into the ferromagnetic metal salts of Co, Co-Ni as the starting metal salt.

Also it is possible to heat the alloy powder obtained by the process of the present invention under vacuum or in nitrogen or hydrogen to improve the magnetic properties of the powder, or to heat the alloy powder in the presence of a small amount of water or oxygen to stabilize the particles against oxidation.

While the invention has been described in detail and in terms of specific embodiments thereof, it will be apparent that various changes and modifications can be made therein without departing from the spirit and scope thereof.

What is claimed is:

1. In a process for preparing a ferromagnetic alloy powder of a cobalt or cobalt-nickel alloy system, which process comprises reducing salts of the ferromagnetic metals in an aqueous solution in the presence of hypophosphite ion to form a ferromagnetic alloy powder, the improvement which comprises incorporating acicular fine powders which are not the same substance as the ferromagnetic alloy into said aqueous solution upon which said ferromagnetic alloy precipitates, said ferromagnetic alloy powder consisting essentially of said acicular fine powder having layered therearound said ferromagnetic alloy.

2. The process of claim 1, wherein said process additionally comprises subjecting said aqueous solution to the action of a magnetic field or the effects of ultrasonic waves during said reduction.

3. The process of claim 1, wherein said aqueous solution additionally contains a minor amount of a rare earth element ion or an ion of aluminum, sulfur, chromium, manganese, iron, copper or zinc.

4. The process of claim 3, wherein said rare earth element ion or said ion of aluminum, sulphur, chromium, manganese, iron, copper or zinc is present in an amount sufficient to improve the coercive force of the resulting ferromagnetic alloy powder.

5. The process of claim 1, wherein said acicular fine powder has an average particle size of less than $0.3\mu$ in length and less than $0.03\mu$ in width.

6. The process of claim 1, wherein said acicular fine powder is diatomaceous earth, goethite lepidocrocite, $\gamma$-$Fe_2O_3$, magnetite, $CrO_2$, copper phthalocyanine, acicular ZnO, $V_2O_5$ or Attapulgus clay.

7. The process of claim 1, wherein said aqueous solution has a pH higher than 5.

8. The process of claim 1, wherein said aqueous solution has a pH of from 8 to 12 and said reducing is at a temperature of 70° to 95°C.

9. The process of claim 1, wherein said acicular fine powder is a non-magnetic material.

10. The process of claim 1, wherein said acicular fine powder is a ferromagnetic material.

11. The process of claim 1 wherein said ferromagnetic alloy powder has a length of 0.1 to 1 micron.

12. The process of claim 11, wherein said ferromagnetic alloy powder has a length/width ratio of 3:1.

13. The process of claim 1, wherein said ferromagnetic alloy powder is precipitated from said aqueous solution, washed and dried.

14. The process of claim 13 consisting essentially of the recited steps.

15. The process of claim 1, wherein the amount of metal present in said aqueous solution is from 0.5 to 20 g/l.

16. The process of claim 1, wherein said ferromagnetic alloy contains about 10 percent by weight or less phosphorous.

17. The process of claim 1, wherein the surface of the acicular fine powder is activated with a noble metal, the ferromagnetic alloy being precipitated thereon in layer form.

18. The process of claim 17, wherein the noble metal is selected from the group consisting of palladium, gold and silver.

19. The process of claim 17, wherein said noble metal is added to said aqueous solution in the chloride form.

* * * * *